Aug. 23, 1938.  A. URFER  2,127,836
RATE OF CLIMB INSTRUMENTS
Filed Feb. 25, 1936
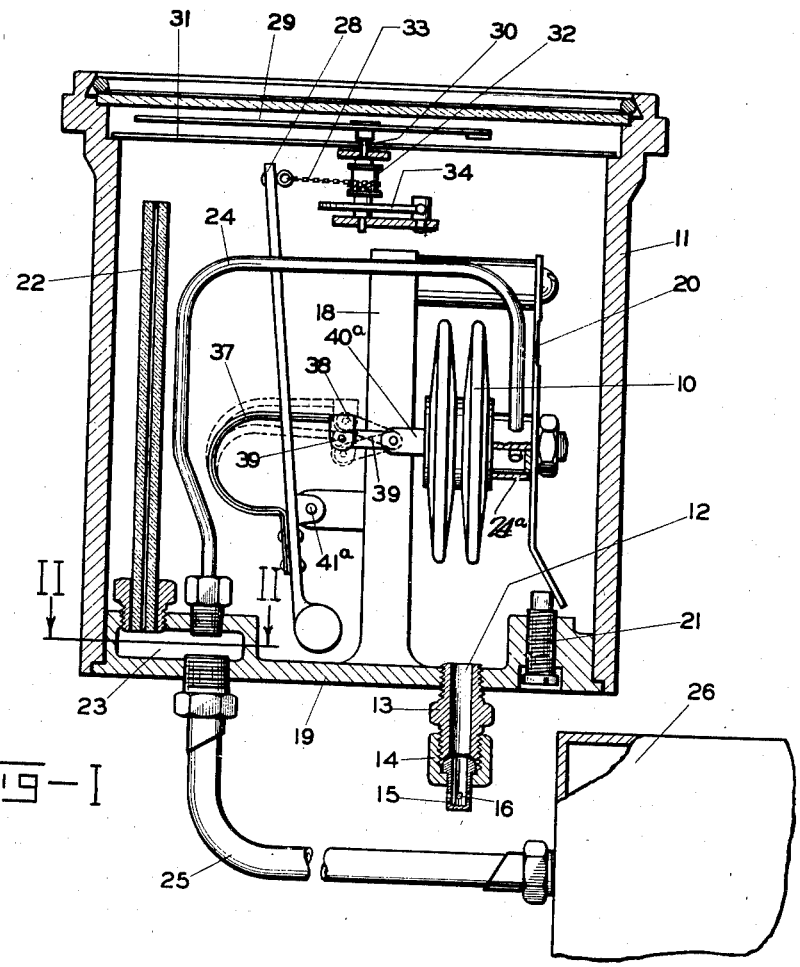
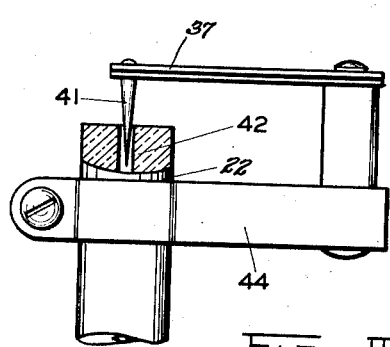
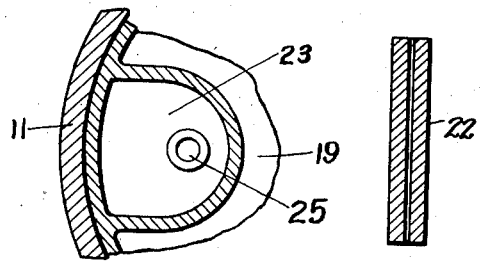
INVENTOR.
Adolf Urfer
BY Stephen Cerstvik
ATTORNEY.

Patented Aug. 23, 1938

2,127,836

UNITED STATES PATENT OFFICE 2,127,836

RATE OF CLIMB INSTRUMENT

Adolf Urfer, New Rochelle, N. Y., assignor to Pioneer Instrument Company, Inc., Brooklyn, N. Y., a corporation of New York Application February 25, 1936, Serial No. 65,713

6 Claims. (Cl. 264—1)

This invention relates to rate of climb instruments and is a continuation-in-part of the disclosure in applicant's co-pending application Serial No. 442,720, filed April 9, 1930, for Rate of climb instruments upon which Patent No. 2,031,803 has been issued and since reissued as Reissue Patent No. 20,263. A simple form of rate of climb instrument may be described as having a diaphragm chamber which communicates with the atmosphere through a restricted orifice similar to a capillary tube. As the instrument is subjected to changing pressure conditions, the pressure within and without the diaphragm chamber tends to become equalized by the flow of air through the capillary tube. The rate of flow of air through the capillary tube under changing pressure conditions is a function of the rate of change of pressure taking place. The movement of an indicating hand which has connection with the yielding wall of such a diaphragm chamber may be used to give an indication of the rate of change of altitude taking place when such an instrument is carried by an aircraft in ascent or descent.

Among the objects of the present invention is to provide a rate of climb indicator of the class described having means for compensating the action or operation of the instrument by making corrections for errors introduced in the operation of the same because of changes in the viscosity of the air for different temperatures.

Another object of the invention is to provide a novel capillary tube of suitable material for automatically controlling the operation of a rate of climb instrument for changes in accordance with temperature so as to afford greater accuracy of indication over wide ranges of temperature changes.

Other objects and advantages will be pointed out hereinafter in the description of the invention and illustrated in the drawing, in which, Fig. I is a section through a rate of climb instrument showing the working elements thereof and embodying the preferred construction of my invention.

Fig. II is a detail on line II—II of Fig. I.

Fig. III illustrates a modified form or device for accomplishing the purpose of the present invention, and Fig. IV is a capillary tube made of suitable material for accomplishing the purpose of the present invention.

It is a common practice to mount a diaphragm chamber 10 within another chamber formed by a casing 11. This second chamber or interior of casing 11 is subjected to atmospheric pressure at all times. The casing 11 preferably is made airtight but it is provided with a vent 12 by means of which it is placed in communication with the atmosphere in a region where normal atmospheric conditions exist. The particular vent connection illustrated has a member 13 to which may be connected, by a union 14, a member 15 having openings 16. This connection may be used in instances where the atmosphere about an instrument or in the vicinity of the vent is subjected to normal atmospheric pressure conditions at the altitude at which the aircraft is traveling. In the event that it is desired to vent the interior of the casing at a remote point, the member 15 may be replaced by a tube extending to a remote place. It is at once apparent that the chamber surrounding the diaphragm chamber and defined, in the present instance, by casing 11 may be of limitless extent so far as the usefulness of the present invention is concerned.

Referring to the construction illustrated herein, pillar 18 which extends from the wall 19 of the instrument supports the spring element 20 upon which is mounted the diaphragm chamber 10. One end of the diaphragm chamber 10 is maintained in a fixed position by an adjusting screw 21 which engages the free end of the spring element 20.

The interior of the diaphragm chamber 10 communicates with the atmosphere through a capillary tube 22. The capillary tube is supported from the wall of a chamber 23 which has free communication with the diaphragm chamber through conduit 24 and a hollow lug 24a. Also communicating with chamber 23, through conduit 25, is a heat insulated tank 26. This heat insulated tank is usually provided and its purpose is to increase the effective volume of air whose pressure is affected by the confined air active from within the diaphragm chamber 10. When the instrument is at a given pressure for any length of time, the same pressure prevails on the inside as well as the outside of the diaphragm chamber 10 and in tank 26 inasmuch as the diaphragm chamber is connected to the outside air by means of the capillary tube 22 and the casing vent 12. If now the aircraft carrying the instrument starts to climb, it immediately gets into air of lower pressure. This pressure becomes the pressure on the outside of the diaphragm chamber 10 because of air escaping through the vent 12. The air inside the diaphragm chamber and in the tank 26 is, however, only at the pressure corresponding to the previous altitude inasmuch as the pressure of the volume of air in the diaphragm chamber and the tank cannot equalize immediately due to the small opening through the capillary tube through which the diaphragm chamber and the tank 26 are connected to the atmosphere. As long as the aircraft continues to climb, the pressure inside the diaphragm chamber remains higher than that outside thereof because it is not possible to catch up with the outside pressure. The pressure difference thus produced causes an expansion of the diaphragm and, hence, the pointer 29 is moved to indicate a climb. As previously stated, the heat insulated tank 26 is provided for the purpose of increasing the effective volume of enclosed air active from within the interior of the expansible diaphragm chamber 10. The rate of flow of air through the capillary tube during a change in elevation is a function of the rate of change of pressure which is taking place as the aircraft ascends, and hence of a function of the rate of change of altitude which produces the rate of change of pressure.

In order to indicate the change of altitude occurring, the motion of the yielding wall of the diaphragm chamber 10 is transmitted through a lever 28 to a needle 29, which is pivoted on a shaft 30. Needle 29 travels across the face of a dial plate 31 upon whose face proper graduations are imprinted. Shaft 30 carries a drum 32 which has fastened to it one end of the flexible element 33. The other end of the flexible element is fastened to the outer end of the lever 28. A hair spring 34 is provided for maintaining the flexible element taut so that the needle 29 is caused to respond to all movements of the lever 28. It has been the practice to connect the lever 28 with the yielding wall or movable end of the diaphragm chamber 10, and, with this understanding, the features of construction just described may be considered for the purpose of the present disclosure as being representative of a construction of a rate of climb instrument in general use.

The relation of the various factors which determine the rate of flow of air through the capillary tube may be expressed by the following formula:

$$P_1 - P_2 = \frac{v 8 n l}{\pi r^4}$$

where P1 is the pressure of the air entering the capillary tube and P2 is the pressure of the air leaving the capillary tube; $r$ is the radius of the orifice; $n$ is the coefficient of internal friction or viscosity of the air; $l$ is the length of the capillary tube; and $v$ is the volume which flows through the orifice in a given time.

The viscosity of the air is less for lower temperatures than it is for higher temperatures. It therefore is apparent that unless compensation is provided the difference in pressure caused by the drop in pressure through the orifice is less at low temperatures than at high temperatures for the same rate of change in altitude, and that because of the greater rate of flow of air at low temperatures than for high temperatures, an indication dependent upon the rate of flow is too low when low temperatures prevail if the instrument has been calibrated to indicate correctly at a higher temperature. Conversely, if an instrument has been calibrated to indicate correctly at a low temperature, the rate of flow of air through the capillary tube is lesser at a high temperature than for a lower temperature for the same rate of change in altitude or pressure and, hence, the instrument would indicate too high. For the purpose of making a clear and concise disclosure of the invention, it will be desirable to refer only to a condition in which the rate of climb instrument has been calibrated to indicate properly at so-called high temperatures, which may be taken to be a high average temperature for temperate climates. The reference temperature is, of course, a matter of convenience and subject to selection.

An instrument of this character, when carried from the ground by an aircraft is usually exposed to much colder temperatures than ground or laboratory temperatures, especially when it is necessary to fly at high altitudes. At the high temperatures the viscosity of the air is increased and the instrument, unless corrected, will give indications of greater rates of change in altitude than those actually taking place. It is therefore desirable to provide means for automatically decreasing the reading of the rate of climb instrument when such conditions prevail, and, for accomplishing this, I have illustrated in Fig. I a thermostatic element 37 in the form of a bimetallic member which is carried by lever 28. The free end 38 of the thermostatic element is pivoted to the link 39, which likewise is pivotally connected to the post 40a, rigidly mounted upon the yielding wall of th diaphragm chamber 10. This thermostatic element is so designed and disposed that its free end 28 moves away from the pivot 41a of lever 28 upon an increase in temperature. Such a movement causes the indicating needle 29 to indicate less than the needle would indicate if no correction were provided for the higher viscosity of the air at the higher temperature prevailing. Upon a decrease of the surrounding temperature, the free end 38 of the thermostatic element 37 moves toward the pivot 41a and increases the effect of the diaphragm on the indicating means. By such movement of the free end of the element in respect to the fulcrum of its supporting lever the reading of the indicating means is increased. It is therefore apparent that the result of undesired influences due to changes of viscosity of the air at different temperatures is corrected.

In Figure III I have shown means by which the compensation may be made in a different manner. Instead of providing the thermostatic element 37 in the chain of mechanism, I may provide said element with a pin 41 and arrange said element in such a position as to enable said pin to enter or recede from the mouth of the orifice 42 of the capillary tube 22. The fastened end of the thermostatic element may be rigidly supported in any manner as, from the capillary tube, by means of a bracket 44. Since the viscosity of the air decreases as the temperature lowers and the rate of flow through the capillary tube becomes greater, the rate of flow may be corrected by reducing the cross sectional area of the orifice of the capillary tube, or any part thereof. Accordingly, the thermostatic element 37 in Fig. III should be so disposed as to cause pin 41 to move toward the capillary tube as the temperature reduces and to move away from the capillary tube as the temperature increases. At a lower temperature than that to which the instrument was subjected when calibrated, the pin 41 will occupy such a position as to compensate for the greater rate of flow which would otherwise take place for the same rate of change in pressure if the efflux of air through the orifice were not impeded.

It is apparent from the foregoing that the cross sectional area of the orifice of the capillary tube may be otherwise controlled as, for example, by making the capillary tube itself out of a suitable material which will expand and contract to adjust the cross sectional area of the orifice to such a dimension as will automatically compensate and correct for changes in viscosity for the different temperatures to which the instrument may be subjected. Such materials may be glass or porcelain as, for example, soda tubing, the cubical coefficient of expansion of which is .000036, or quartz having a coefficient of .0000353, or preferably said materials may be metals or alloys of metals having sufficiently high coefficients of expansion and contraction to perform the desired function, such metals being, for example, 30% nickel-steel having a coefficient of .000036, or soft iron with a coefficient of .0000353; it being expressly understood, however, that the invention is not limited to the use of the specified materials mentioned and any material suitable for the purpose of the invention may be employed. The material desired to be employed may be readily determined by mathematical calculation by employing the formula given above and obtaining the relation existing between $n$, the coefficient of internal friction or viscosity of the air, and $r$, the radius of the passage through the capillary tube. The materials may then be readily selected by reference to any standard handbook of physics, chemistry or metallurgy wherein such materials are listed and their coefficients of expansion given.

From the formula above set forth, it is to be noted that the pressure differential is inversely proportional to the fourth power of the radius of the orifice of the capillary tube. The mathematical relation which the radius of the orifice bears to the existing temperature makes it possible to provide a tube member capable of contracting sufficiently at low temperatures to reduce the cross sectional area of the orifice the proper amount. The material of such a tube would have a coefficient of expansion of such an order that its orifice would change under different temperatures sufficiently for compensating the instrument by taking into account changes in viscosity of the air to provide correct indication under varying temperature conditions. With a prevailing low temperature the orifice of the capillary tube would be reduced and thus compensate for the greater flow which would otherwise exist through an orifice whose size has not been diminished the proper amount, and vice versa.

While I have referred in detail to various forms of devices by which errors due to changes in the viscosity of the air may be compensated for in rate of climb instruments, I do not wish to be restricted to any one embodiment of the invention disclosed, for it is apparent that changes in relations of parts and of combinations come within the purview of the present invention. To that end I contemplate such alterations and modifications as utilize thermostatic means for accomplishing the purposes primarily set forth and within the scope of the appended claims.

What I claim is:

1. In a rate of climb indicator for aircraft, the combination of an expansible diaphragm device operated in accordance with changes in altitude, a capillary tube connected to the interior of said diaphragm device for providing a restricted flow of air from said device in accordance with the rate of change of altitude, and indicating means operated by said device for indicating said rate of change of altitude, said capillary tube having a passage of such area as to properly restrict the air flow at a chosen temperature and being composed of a material having a coefficient of expansion of the order of 0.000035 so that the cross-section of the capillary passage is changed under departures from said chosen temperature sufficiently to compensate the action of the rate of climb indicator by taking into account changes in the viscosity of the air due to temperature changes to provide correct indications under varying temperature conditions.

2. In combination, an expansible diaphragm having a yielding wall subject to atmospheric pressure on one side thereof, means for retarding the rate at which pressure on the other side of said yielding wall tends to become equal to a changing atmospheric pressure due to changes in altitude, and indicating means actuated by said yielding wall in accordance with the rate of change of altitude, said retarding means comprising a tube having a passage of such area as to properly restrict the air flow at a chosen temperature and composed of a material having a coefficient of expansion of the order of 0.000035 so that the cross-section of the passage through the tube is changed under departures from said chosen temperature sufficiently to compensate the movement of the indicating means due to temperature changes to provide correct indications under varying temperature conditions.

3. In an instrument for indicating rate of change of altitude, a casing, means communicating said casing with the atmosphere, a movable indicator carried by said casing, an expansible diaphragm in said casing, operating means connecting said diaphragm and said indicator for operating the latter by the former, and a capillary tube having a connection to said expansible diaphragm for providing restricted communication between the interior of said expansible diaphragm and the atmosphere through said casing, said capillary tube having a passage of such area as to properly restrict the air flow at a chosen temperature and being composed of a material having a coefficient of expansion of the order of 0.000035 so that the cross-section of the capillary passage is changed under departures from said chosen temperature sufficiently to compensate the action of the instrument due to temperature changes to provide correct indications under varying temperature conditions.

4. In an instrument for indicating rate of change of altitude, a casing, means communicating said casing with the atmosphere, a movable indicator carried by said casing, an expansible diaphragm in said casing, operating means connecting said diaphragm and said indicator for operating the latter by the former, a reservoir containing air and having communication with the interior of said diaphragm, and a capillary tube having a connection to said diaphragm and said reservoir for providing restricted communication between the interior of said diaphragm and the atmosphere through said casing, said capillary tube having a passage of such area as to properly restrict the air flow at a chosen temperature and being composed of a material having a coefficient of expansion of the order of 0.000035 so that the cross-section of the capillary passage is changed under departures from said chosen temperature sufficiently to compensate the action of the instrument due to temperature changes to provide correct indications under varying temperature conditions.

5. In combination, an expansible diaphragm having a yielding wall subject to atmospheric pressure on one side thereof, means for retarding the rate at which pressure on the other side of said yielding wall tends to become equal to a changing atmospheric pressure due to changes in altitude, and indicating means actuated by said yielding wall in accordance with the rate of change of altitude, said retarding means comprising a capillary tube having a passage of such area as to properly restrict the air flow at a chosen temperature and composed of a material having a coefficient of expansion of the order of 0.000035 so that the cross-section of the capillary passage is changed under departures from said chosen temperature sufficiently to compensate the movement of the indicating means due to temperature changes to provide correct indications under varying temperature conditions.

6. In a rate of climb indicator for aircraft, the combination of an expansible diaphragm device operated in accordance with changes in altitude, means providing a passage connected to the interior of said diaphragm device for controlling the flow of air from said device in accordance with the rate of change of altitude, indicating means operated by said device for indicating said rate of change of altitude, the walls of said passage defining a passage of such area that the air flow is properly controlled at a chosen temperature and being composed of a material having a coefficient of expansion of the order of 0.000035 so that said passage is changed in area under departures from said chosen temperature sufficiently to compensate for changes in the flow of air from said device, due to changes in viscosity with said different temperatures.

ADOLF URFER.